(12) United States Patent
Chaplin et al.

(10) Patent No.: US 11,384,792 B2
(45) Date of Patent: Jul. 12, 2022

(54) SLEWING BEARING FOR FOOD PROCESSING EQUIPMENT

(71) Applicants: AKTIEBOLAGET SKF, Gothenburg (SE); KAYDON S DE R.L. DE C.V., Guadalupe (MX)

(72) Inventors: Raymond Lee Chaplin, Draper, UT (US); Reinhard Messner, Gaal (AT); Joel Eduardo Quintanilla López, Guadalupe (MX); Roberto Ricardo Rodriguez, Sugar Land, TX (US); David J VanLangevelde, Spring Lake, MI (US)

(73) Assignees: AKTIEBOLAGET SKF, Gothenburg (SE); KAYDON S DE R.L. DE C.V., Guadalupe (MX)

( * ) Notice: Subject to any disclaimer, the term of this patent is extended or adjusted under 35 U.S.C. 154(b) by 2 days.

(21) Appl. No.: 17/007,760

(22) Filed: Aug. 31, 2020

(65) Prior Publication Data
US 2022/0065299 A1 Mar. 3, 2022

(51) Int. Cl.
*F16C 33/78* (2006.01)
*F16C 19/06* (2006.01)

(52) U.S. Cl.
CPC .......... *F16C 33/7886* (2013.01); *F16C 19/06* (2013.01); *F16C 33/783* (2013.01); *F16C 33/7853* (2013.01); *F16C 2300/14* (2013.01)

(58) Field of Classification Search
CPC .... F16C 19/06; F16C 33/783; F16C 33/7853; F16C 33/7856; F16C 33/7886; F16C 2300/14; F16C 2300/42
See application file for complete search history.

(56) References Cited

U.S. PATENT DOCUMENTS

| 3,370,333 A * | 2/1968 | Gibson | F16C 19/163 |
| | | | 29/898.063 |
| 4,906,113 A * | 3/1990 | Sague | E02F 9/12 |
| | | | 384/507 |
| 2013/0062833 A1* | 3/2013 | Frank | F16C 33/7886 |
| | | | 277/345 |

(Continued)

FOREIGN PATENT DOCUMENTS

JP H07243448 A * 9/1995

*Primary Examiner* — Alan B Waits
(74) *Attorney, Agent, or Firm* — J-TEK Law PLLC; Scott T. Wakeman; Mark A. Ussai

(57) ABSTRACT

A slewing bearing includes an inner annular body formed of unhardened stainless steel and coupleable with a fixed member and having an inner race with an unhardened race surface. An outer annular body is disposed about the inner body and is formed of unhardened stainless steel, is coupleable with a rotatable member, and has an outer bearing race with an unhardened race surface and a plurality of gear teeth engageable by a drive pinion to angularly displace the outer body. Rolling elements are disposed between and rotatably couple the inner and outer annular bodies. An annular seal is coupled with the outer annular body and has two opposing axial ends, an axial thickness defined between the ends, a sealing lip engageable with the inner body and an outside diameter and is sized such that the ratio of the outside diameter to the axial thickness is greater than fifty.

16 Claims, 9 Drawing Sheets

(56) References Cited

U.S. PATENT DOCUMENTS

| | | | |
|---|---|---|---|
| 2015/0300404 A1* | 10/2015 | Frank | C23C 18/1621 |
| | | | 384/510 |
| 2020/0269363 A1* | 8/2020 | Lambeck | B23K 37/0247 |
| 2021/0246941 A1* | 8/2021 | Capoldi | F16C 43/04 |

* cited by examiner

SLEWING BEARING FOR FOOD PROCESSING EQUIPMENT

BACKGROUND OF THE INVENTION

The present invention relates to bearings, and more particularly to slewing bearings or rings used in the food processing industry.

Slewing bearings or "slewing rings" are generally known and include inner and outer rings coupled by a plurality of rolling elements, one of the two rings having gear teeth to rotatably drive the one ring with respect to the other ring. In the food processing industry, slewing bearings have been used to angularly displace a first tubular conveyor member with respect to a second tubular conveyor member. In such applications, the slewing bearings are subjected to extensive cleaning to avoid contaminating the food being processed, which may lead to damage of the rolling elements and the bearing raceways by high pressure and/or corrosive cleaning fluids.

SUMMARY OF THE INVENTION

The present invention is a slewing bearing for angularly displacing a rotatable member with respect to a fixed member about a central axis. The slewing bearing comprises an inner annular body formed of unhardened stainless steel and coupleable with the fixed member, the inner annular body having a centerline coaxial with the central axis and an inner bearing race with an unhardened race surface. An outer annular body is disposed about the inner body and is formed of unhardened stainless steel, coupleable with the rotatable member, and has an outer bearing race with an unhardened race surface spaced radially outwardly from the inner race. The outer body further has a plurality of gear teeth spaced about the centerline and configured to be engaged by a drive pinion so to angularly displace the outer body about the central axis. Further, a plurality of rolling elements are disposed between the inner and outer annular bodies so as to be rollable upon the inner and outer races to rotatably couple the inner and outer bodies. An annular seal is coupled with the outer annular body and has opposing first and second axial ends, an axial thickness being defined between the axial ends, and a sealing lip sealingly engageable with the inner annular body and having an outside diameter. The seal is sized such that the ratio of the seal outside diameter to the seal axial thickness is greater than fifty (50).

Preferably, the outer annular body has a recess defined by an inner circumferential surface and a radial surface and the seal is disposed within the recess such that an outer surface of the seal is spaced inwardly from the recess inner surface, a first axial end of the seal is disposed against the recess radial surface and a second axial end of the seal is disposable against a flange of the rotatable member. Further, the seal preferably has an outer annular recess extending radially inwardly from the seal outer surface and a retainer ring is disposed within the seal outer recess and against the recess inner circumferential surface. The retainer ring is configured to retain the seal within the outer body recess. Furthermore, the seal preferably further has an axial annular recess extending axially inwardly from the seal second axial end and a seal ring is disposed within the axial recess. The seal ring is compressible between the seal and the rotatable member to prevent fluid leakage between the primary seal and the flange.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Figure 1:
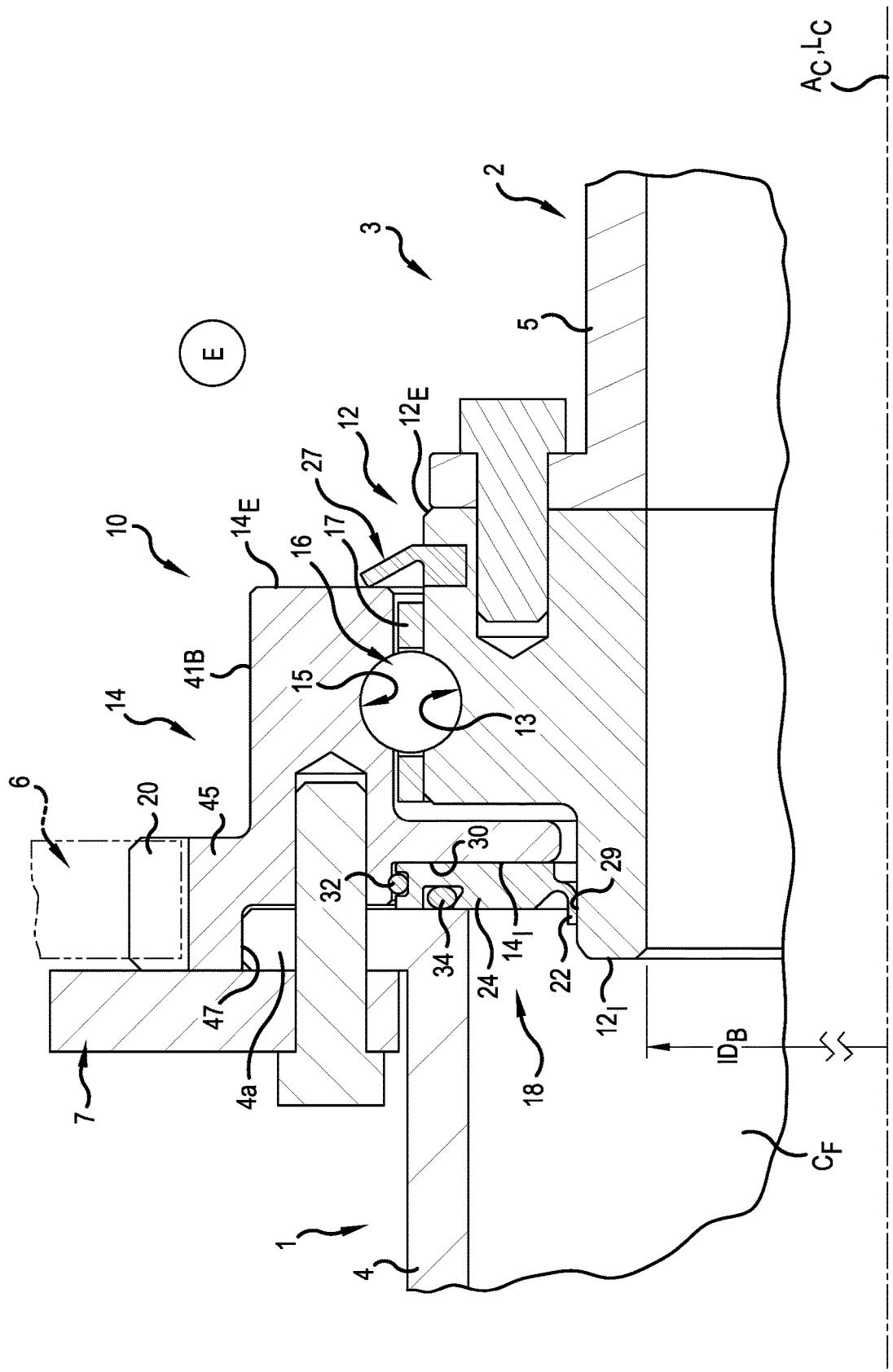
FIG. 1 is a broken-away, axial cross-sectional view of a food conveyor assembly including a slewing bearing according to the present invention.
Figure 2:
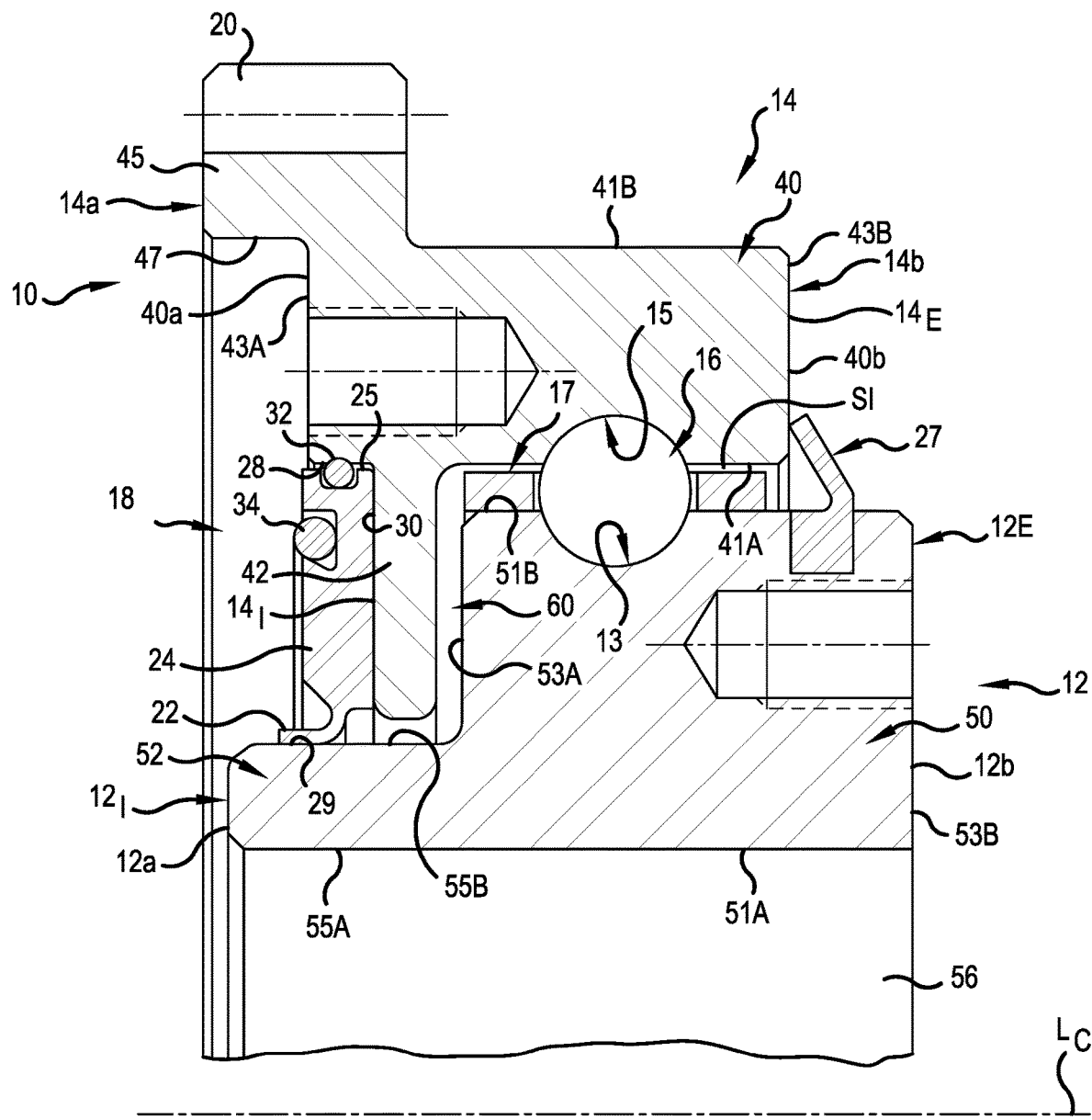
FIG. 2 is an enlarged, axial cross-sectional view of the slewing bearing.
Figure 3:
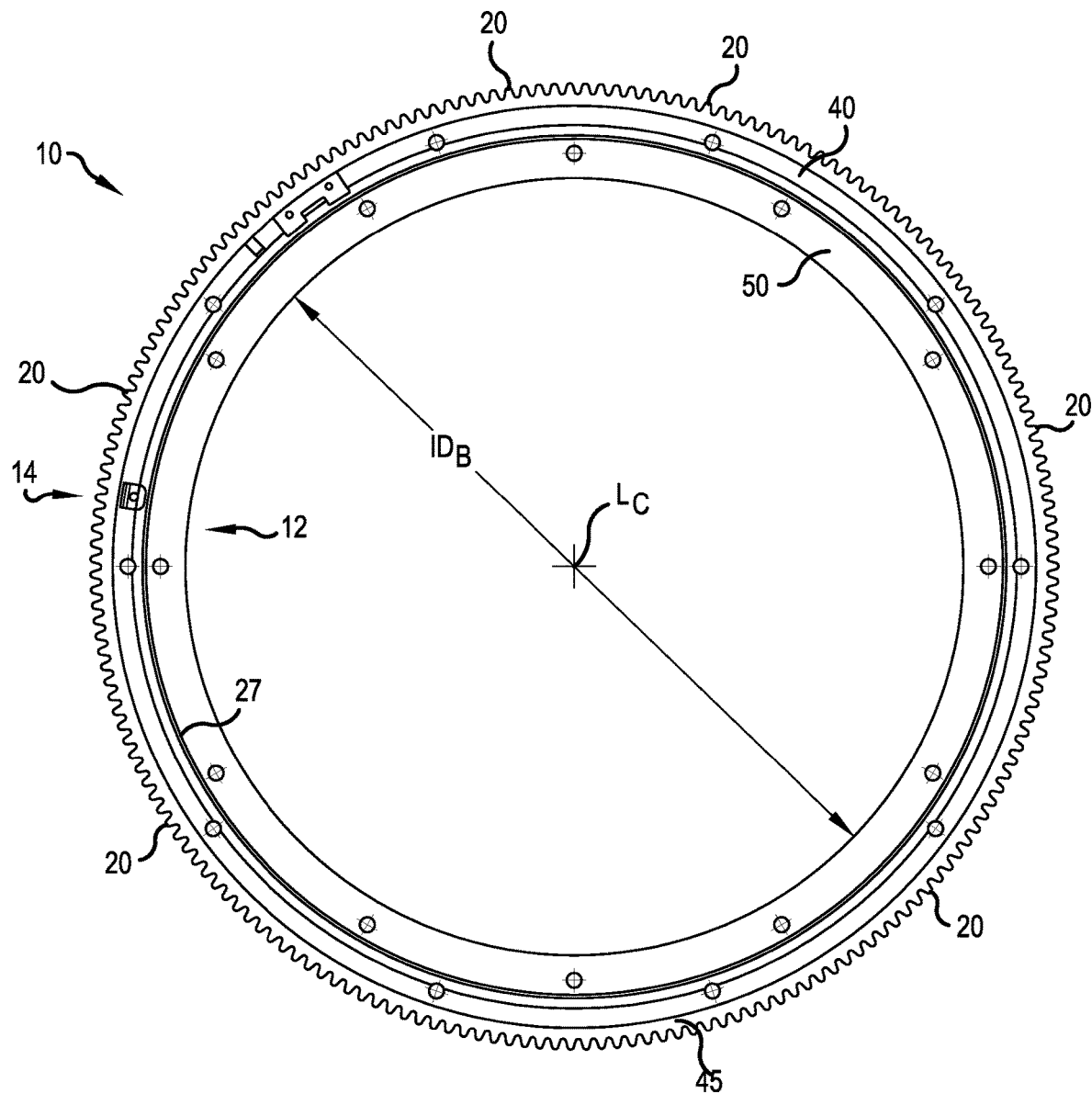
FIG. 3 is a side plan view of the slewing bearing.
Figure 4:
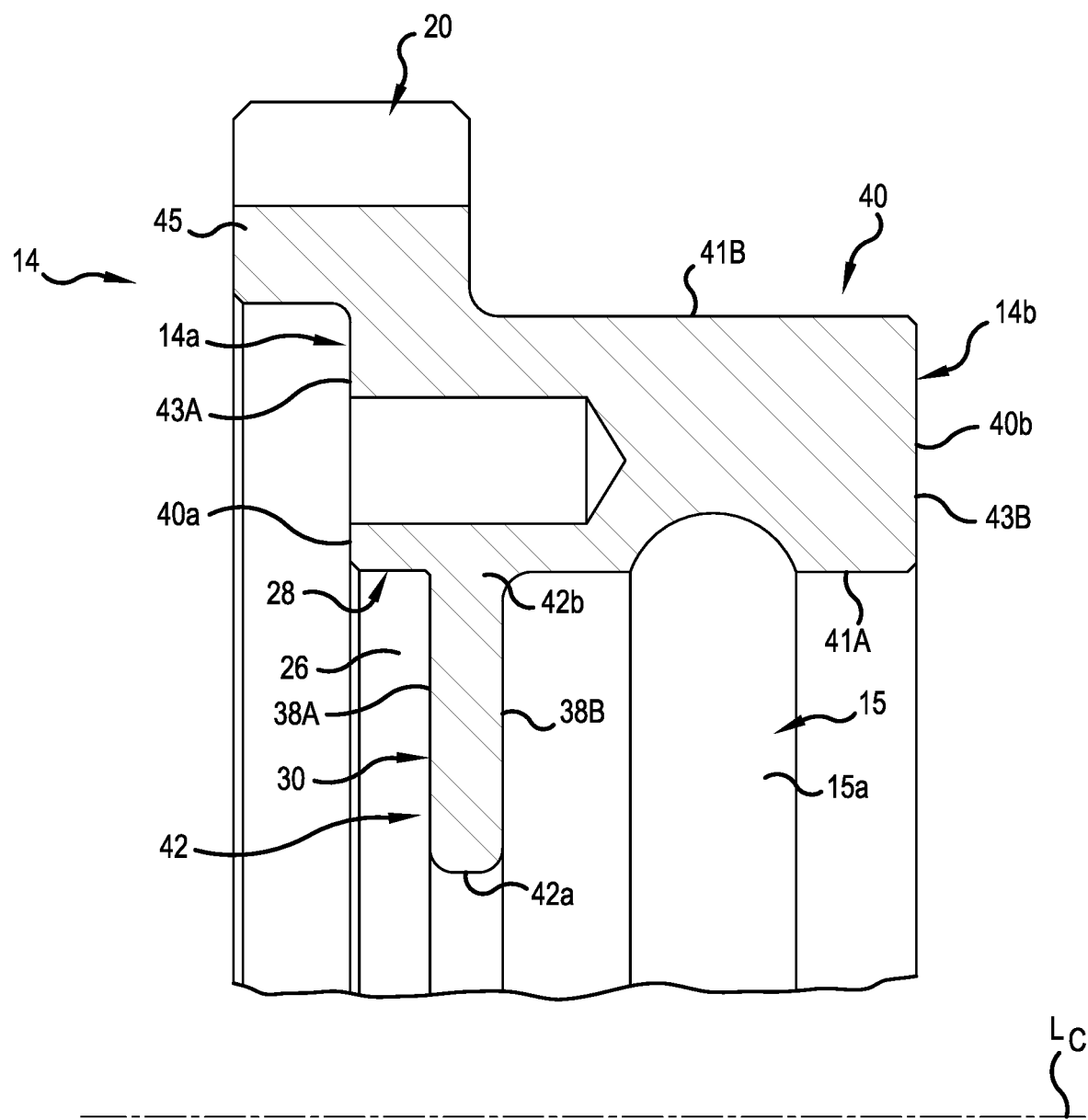
FIG. 4 is a broken-away, axial cross-sectional view of an outer annular member of the slewing bearing.

Referring now to the drawings in detail, wherein like numbers are used to indicate like elements throughout, there is shown in FIGS. 1-9 a slewing bearing 10 for angularly displacing a rotatable member 1 with respect to a fixed member 2 about a central axis $A_C$. Preferably, the two members 1, 2 are components of a food conveyor assembly 3, specifically, the first member 1 is a rotatable conveyor tube 4 and the fixed member 2 is a fixed conveyor tube 5, but may be any other appropriate mechanical components requiring relative angular displacement. The slewing bearing 10 basically comprises an inner annular body 12 coupleable with the fixed member 2, an outer annular body 14 coupleable with the rotatable member 1, a plurality of rolling elements 16 disposed between the inner and outer bodies 12, 14, respectively, and a primary seal 18 coupled with the outer annular body 12 and sealable against the inner annular body 14. The inner and annular bodies 12, 14 connect the conveyor tubes 1, 2 such that each body 12, 14 has an interior side $12_I$, $14_I$ disposed within a food conveying chamber $C_F$ and an exterior side $12_E$, $14_E$ disposed within the exterior environment E, as indicated in FIG. 1. In a current preferred application, the slewing bearing 10 has a relatively large inside diameter $ID_B$, greater than fifteen inches (15"), in order to provide a sufficient space for conveyance of food products therethrough, but has a relatively lesser or narrow overall axial dimension, less than two inches (2"), to fit within an existing conveyor assembly 3. As such, the slewing bearing 10 is of a type referred to as a "thin section bearing".

More specifically, the inner annular body 12 is preferably formed of unhardened stainless steel and has a centerline $L_C$ and an inner bearing race 13 with an unhardened race surface 13a. The outer annular body 14 is disposed about the inner body 12, is preferably formed of unhardened stainless steel and has an outer bearing race 15, preferably with an unhardened race surface 15a, and is spaced radially outwardly from the inner race 13. Also, the outer annular body 14 has a plurality of gear teeth 20 spaced about the centerline $L_C$ and configured to be engaged by a drive pinion 6 (FIG. 1) so to angularly displace the outer body 14, and thereby the rotatable member 1, about the central axis $A_C$.

Figure 7:
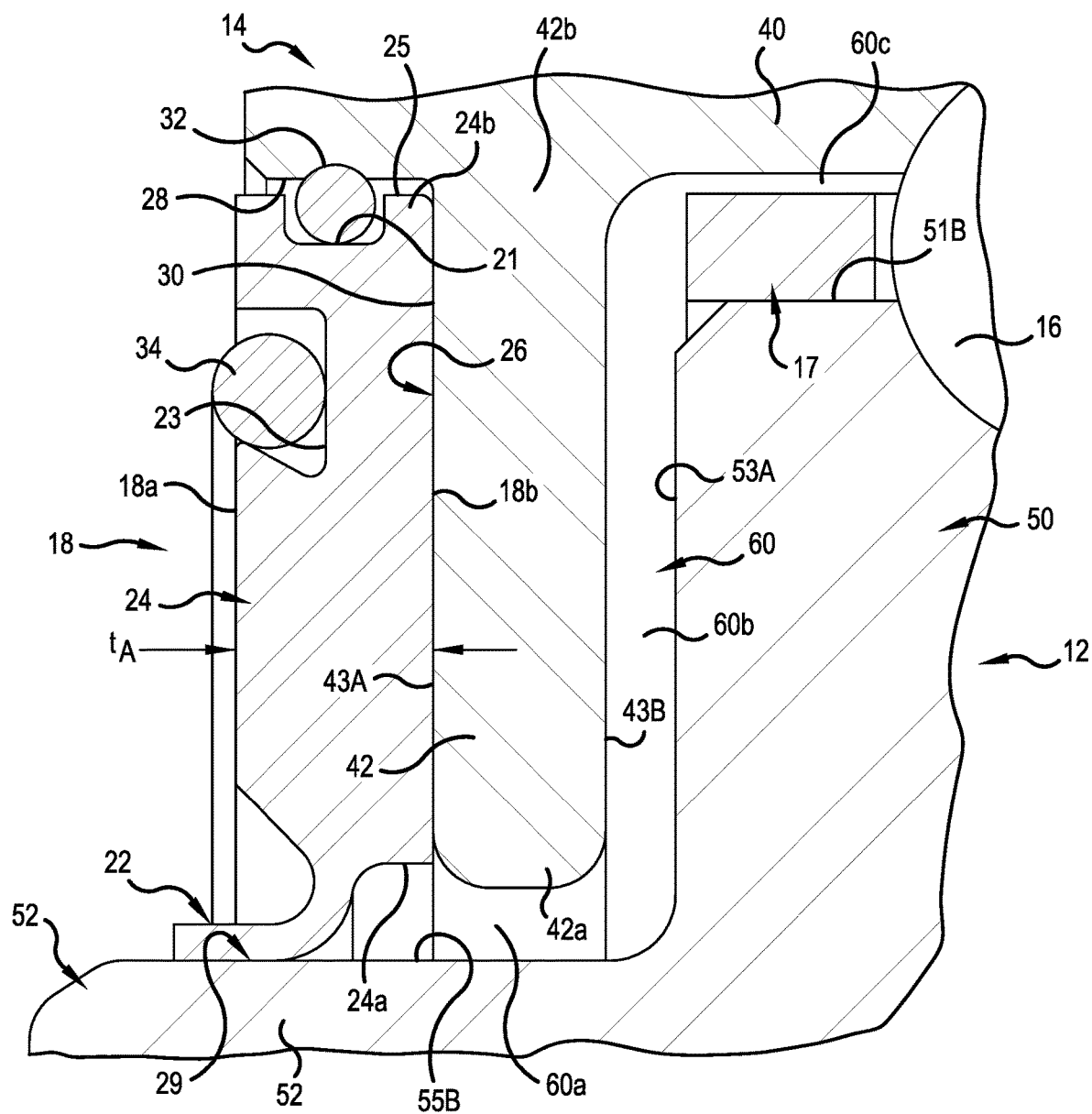
FIG. 7 is a broken-away, enlarged view of a portion of FIG. 2, showing a primary seal.
Figure 8:
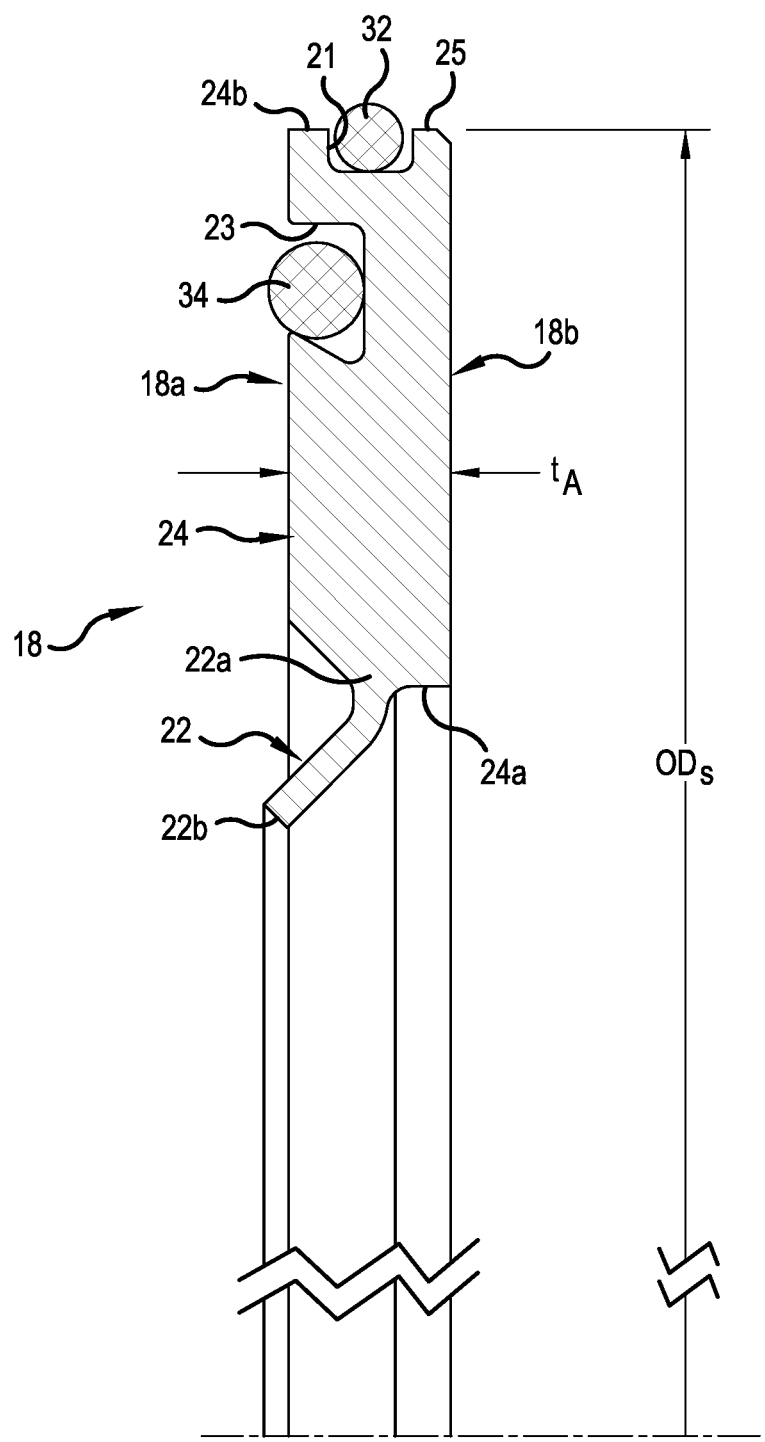
FIG. 8 is a broken-away, axial cross-sectional view of the primary seal of the slewing bearing.
Figure 9:
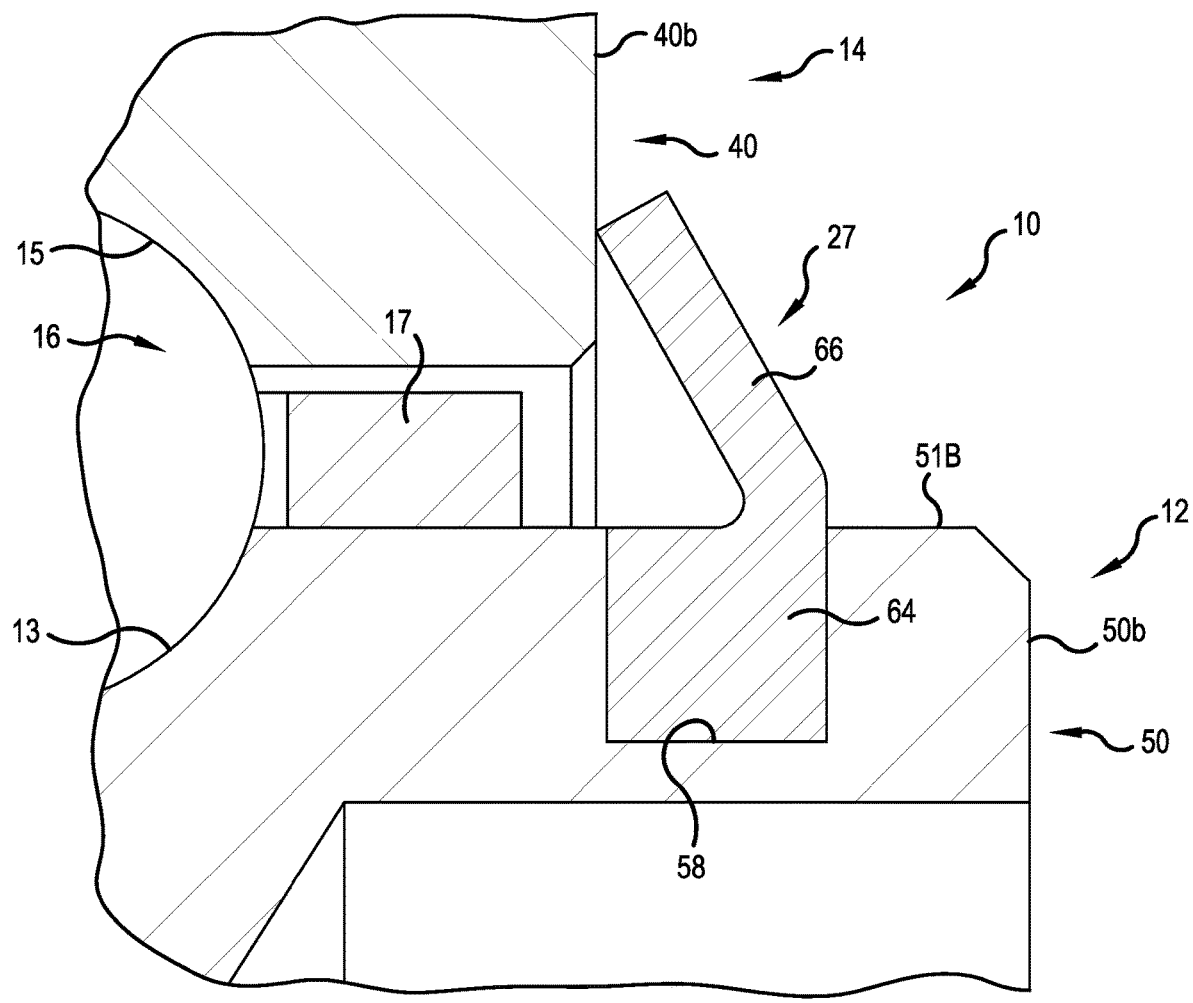
FIG. 9 is a broken-away, enlarged view of another portion of FIG. 2, showing a secondary seal.

Further, the plurality of rolling elements 16 are rollable upon the inner and outer races 13, 15, respectively, so as to rotatably couple the inner and outer bodies 12, 14, respectively, with the interior space SI (FIG. 2) between the rings 12, 14 and through which the elements 16 traverse preferably being filled with a food grade grease with extreme pressure additives. Each rolling element 16 is preferably a spherical ball, but may be a cylindrical roller, a tapered roller, etc., and is preferably formed of stainless steel, the plurality of elements 16 preferably being circumferentially spaced by a plastic separator 17. Further, the primary annular seal 18 has an outside diameter ODs (FIG. 8) and opposing first and second axial ends 18a, 18b, respectively, an axial thickness $t_A$ being defined between the axial ends 18a, 18b, as indicated in FIGS. 7 and 8. The seal 22 has an inner sealing lip 22 sealingly engageable with an engagement surface 29 of the inner annular body 12 so as to prevent fluids or solid particles from entering between the annular bodies 12, 14, particularly cleaning fluids which could damage the raceways 13, 15 or rolling elements 16.

More specifically, the primary seal 18 has a main body portion 24 with inner and outer radial ends 24a, 24b and an outer circumferential surface 25 on the outer end 24b, and the sealing lip 22 extends from the inner radial end 24a of the main body portion 24. The sealing lip 22 is generally annular and has an outer radial end 22a integrally formed with the main body portion 24 and extends both radially and axially to a free, inner radial end 22b, as indicated in FIG. 8. Preferably, the seal 18 is formed of a food grade polymeric material. Additionally, in order to integrate with existing components of the rotatable member 2, as described below, the seal 18 is preferably sized such that the ratio of the seal outside diameter ODs to the seal axial thickness $t_A$ is greater than fifty (50), most preferably greater than eighty (80), and in a current construction is about one hundred (100). Furthermore, the slewing bearing assembly 10 preferably further includes a secondary seal 27 coupled with the inner annular body 12 and sealable against the outer annular body 14, as described below.

Referring to FIGS. 7 and 8, the outer annular body 14 has opposing first and second axial ends 14a, 14b and a circular recess 26 extending inwardly from the first axial end 14a. The recess 26 is defined by an inner circumferential surface 28 and a radial surface 30 spaced from the outer ring axial end 14a. With this structure, the primary seal 18 is disposed within the recess 26 of the outer annular body 14 such that the seal outer surface 25 is spaced inwardly from the recess inner circumferential surface 28, the seal first axial end 18a is disposed against the recess radial surface 30 and the seal second axial end 18b is disposable against a flange 4a (FIG. 1) of the preferred rotatable member 2 (i.e., conveyor tube 4).

Preferably, the seal 18 further has an outer annular recess 21 extending radially inwardly from the seal outer surface 25 and the slewing bearing 10 further comprises a retainer ring 32 disposed within the seal outer recess 21 and against the inner circumferential surface 28 of the outer body recess 26. The retainer ring 32 is configured to retain the seal 18 within the outer body recess 26, as well as to center the seal 18 about the centerline $L_C$. Specifically, the retainer ring 32 is preferred to retain the seal 18 within the recess 26 as the relatively large outside diameter ODs (e.g., 17.7") and relatively small axial thickness (e.g., 0.177") may cause the seal 18 to become dislodged from or "pop out" of the recess 26 when retained by friction between the seal outer surface 25 and the annular body 14. Further, the primary seal 22 preferably further has an axial annular recess 23 extending axially inwardly from the second axial end 18b and the slewing bearing 10 further comprises a seal ring 34 disposed within the seal axial recess 23. The seal ring 34 is compressible between the seal 18 and the rotatable member flange 4a and functions to seal between the outer annular body 14 and the flange 4a.

Referring to FIGS. 2, 4, 5 and 7, the outer annular body 14 is preferably generally L-shaped and has a main body portion 40 and a radial flange portion 42 extending inwardly from the main body portion 40. The main body portion 40 has inner and outer circumferential surfaces 41A, 41B and opposing axial ends 40a, 40b with radial surfaces 43A, 43B, respectively. The flange portion 42 extends radially inwardly from the inner surface 41A and has inner and outer radial ends 42a, 42b, respectively, and opposing first and second radial surfaces 38A, 38B, respectively. The flange portion 42 is spaced axially inwardly from the first axial end 40a of the main body portion 40 and the first radial surface 38A provides the radial surface 30 of the outer body seal recess 26, the recess circumferential surface 28 being defined by a section of the inner surface 41A between the body end 40a and the flange portion 42. Further, the bearing outer race 15 is formed on the inner circumferential surface 41A of the main body portion 40 of the outer body 14 and the plurality of gear teeth 20 extend radially outwardly from the outer surface 41B of the main body portion 42. Preferably, the main body portion 40 also includes an annular shoulder section 45 extending outwardly from the outer circumferential surface 41B and axially beyond the body portion first axial end 40a, which provides the gear teeth 20, such that a counterbore 47 is defined adjacent to the body first axial end 40a for receiving the flange 4a of the rotatable tube 4.

Figure 5:
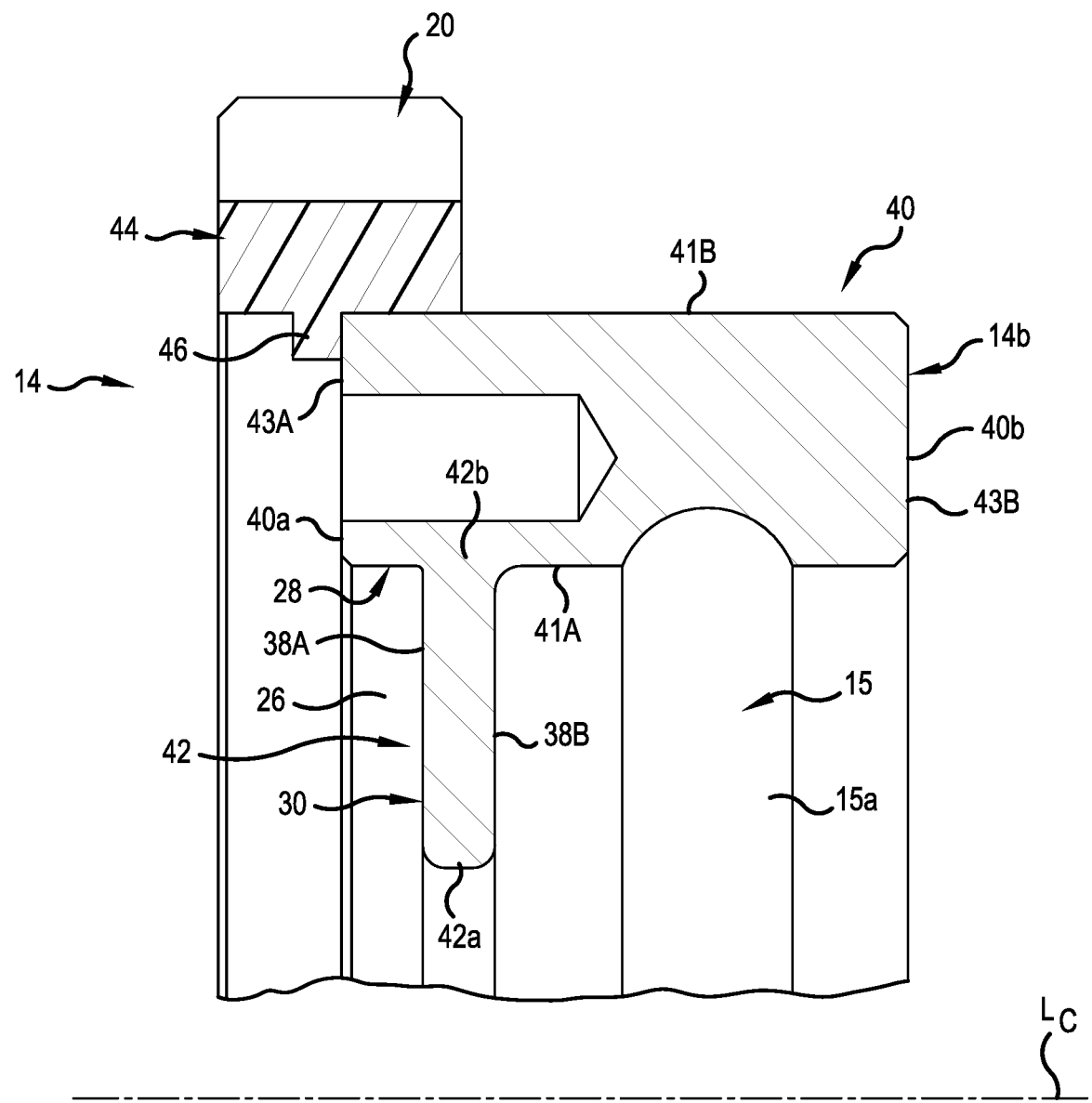
FIG. 5 is a broken-away, axial cross-sectional view of an alternative construction of the outer annular member.
Figure 6:
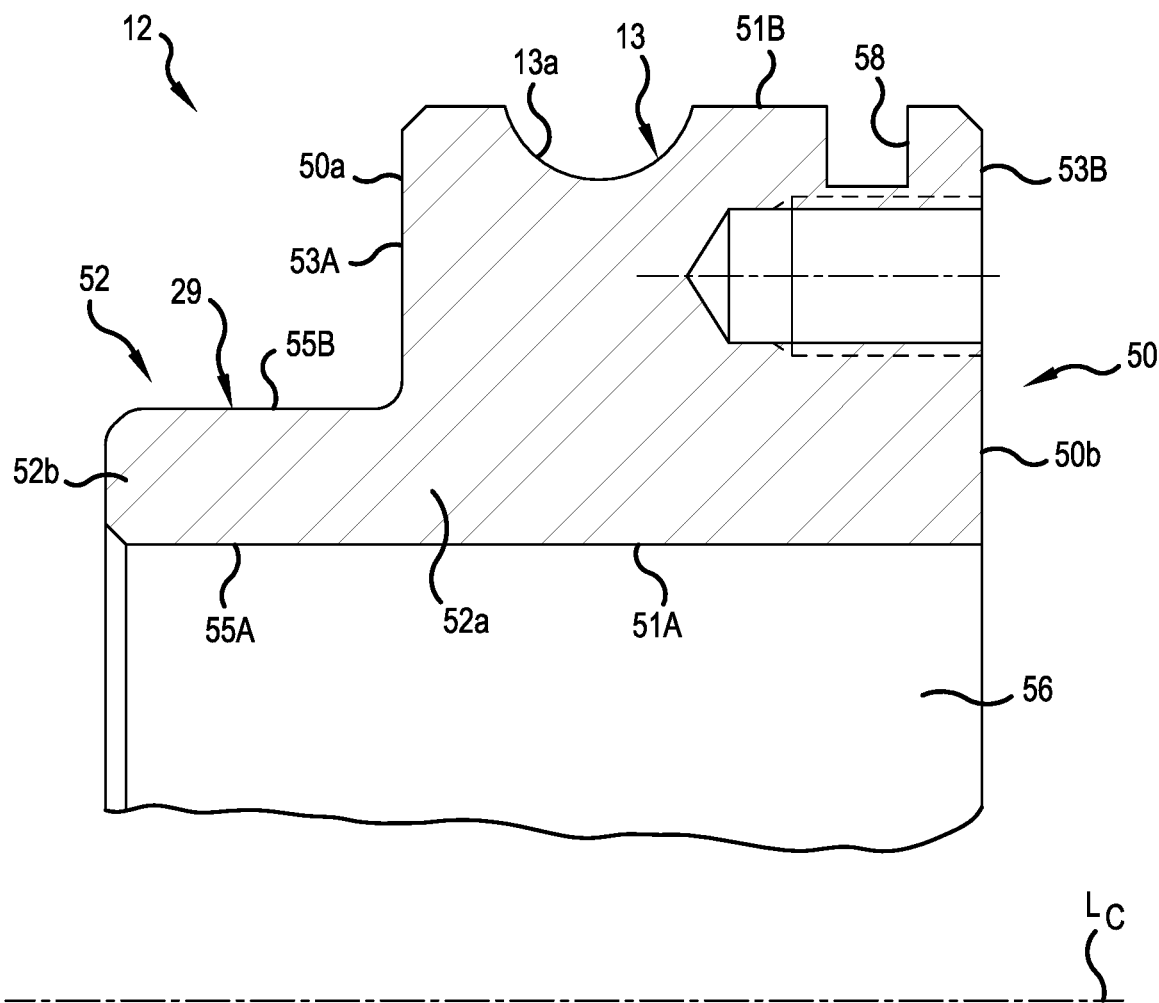
FIG. 6 is a broken-away, axial cross-sectional view of an inner annular member of the slewing bearing.

More specifically, the plurality of gear teeth 20 are arranged such that each tooth 20 extends along the centerline $L_C$, so that driving of the teeth 20, i.e., by the pinion 6, angularly displaces the outer body 14 and connected tube 4 about the coaxial central axis $A_C$. In certain constructions shown in FIGS. 1-4, the plurality of gear teeth 20 are integrally formed with the main body portion 40 of the outer annular body 14, specifically the shoulder section 45. In other constructions, the plurality of gear teeth 20 are provided by a separate polymeric ring 44 attached to a remainder of the main portion 40 of the outer annular body by any appropriate means (e.g., threaded fasteners), as depicted in FIG. 5. In the case of the separate polymeric ring 44, the ring 44 preferably includes an inner annular shoulder 46 disposable against the first axial end 40a of the main body portion 40 (as shown) or within an annular recess (not shown) formed in the main body portion 40.

Referring to FIGS. 2, 6, 7 and 9, the inner annular body 12 is generally L-shaped, so as to generally interlock with the L-shaped outer body 14, and has a main body portion 50 and an axial flange portion 52 extending from the main body portion 50. The main body portion 50 has inner and outer circumferential surfaces 51A, 51B, respectively, and opposing first and second axial ends 50a, 50b with radial surfaces 53A, 53B, respectively. The bearing inner race 13 is formed within the outer surface 51B of the main body portion 50 and the inner surface 51A, along with an inner surface 55A of the flange portion 52, collectively define a central bore 56 through which food is conveyed during use of the conveyor assembly 3. Further, the axial portion 52 extends outwardly from the first axial end 52a adjacent to the main portion inner surface 51A and has opposing inner and outer circumferential surfaces 55A, 55B, respectively, and inner and outer axial ends 52a, 52b, respectively. The outer surface 55B of the axial flange portion 52 provides the sealing engagement surface 29 for the primary seal 18.

With the above-structure, when the inner and outer annular bodies 12, 14 are coupled by the rolling elements 16, the radial flange portion 42 of the outer annular body 14 is spaced axially from the first radial surface 53A of the inner annular body 12 and spaced radially outwardly from the outer circumferential surface 55A of the inner body flange portion 52. As such, a labyrinth 60 is defined between the inner and outer annular bodies 12, 14 and includes a radially-inner axial portion 60a between the inner body axial flange 52 and the outer body radial flange 42, a radial portion 60b between the outer body radial flange 42 and the inner body main portion 50, and a radially-outer axial section 60c between the inner body main portion 50 and the outer body main portion 40, as indicated in FIG. 7. In addition to providing the necessary spacing for relative displacement between the inner and outer annular bodies 12, 14, the labyrinth 60 functions as a backup seal to the primary seal 18. That is, any leakage of fluids through the primary seal interface must traverse radially-outwardly through the labyrinth radial portion 60b.

Furthermore, the main body portion 50 of the inner annular body 12 extends axially outwardly from the second radial end 40b of the outer body main portion 40 and further has an annular groove 58. The groove 58 extends radially inwardly from the outer circumferential surface 55A and is disposed axially between the inner race 13 and the second radial end 50b. The secondary seal 27 is preferably formed of an elastomer, most preferably a thermoplastic polyurethane elastomer ("TPU"), and includes an annular main body 64 disposed within the groove 58 of the inner annular body 50 and an annular sealing lip 66. The sealing lip 66 is sealingly engageable with the second axial end 40b of the outer annular body 14.

The secondary seal 27 prevents contaminants in the environment exterior to the food conveyor 3 from entering between the inner and outer bodies 12, 14 and potentially damaging the races 13, 15 and rolling elements 16. As exterior contamination is less of an issue due to non-exposure to any food being processed, and vice-versa, the surfaces of the exterior sides 12E, 14E of inner and outer bodies 12, 14 are not subjected to high-pressure cleaning fluids. Therefore, the secondary seal 27 may be formed less robust than the primary seal 18.

The slewing bearing 10 of the present invention has a number of advantages over previously known bearing assemblies used in food processing equipment. By forming the inner and outer bodies 12, 14 of stainless steel, the bodies 12, 14 are capable of handling wet food items (e.g., raw poultry) and be subjected to daily cleaning with high pressure fluids and/or caustic chemicals without becoming damaged thereby, and the primary seal 18 prevents leakage of such chemicals or water into the bearing 10. Also, the preferred stainless steel enables the inner and outer bodies 12, 14 to withstand relatively heavy loading without requiring hardening of the entire bodies 12, 14 or at least the bearing race surfaces 13a, 15a, which eliminates such a hardening process typically required during bearing manufacturing, and thereby reduces costs. Also, the particular stainless steel is preferably weldable, such that the slewing bearing 10 may be attached to other mechanical components by a welding process. Further, the primary seal 18 is sufficiently robust to prevent substances from entering the bearing 10, such as high-pressure cleaning fluids, and is made sufficiently large and narrow to fit within the available profile of the slewing bearing 10.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A slewing bearing for angularly displacing a rotatable member with respect to a fixed member about a central axis, the slewing bearing comprising:
   an inner annular body coupleable with the fixed member, the inner annular body having a centerline coaxial with the central axis and an inner bearing race;
   an outer annular body disposed about the inner body, coupled with the rotatable member, and having an outer bearing race spaced radially outwardly from the inner race and a plurality of gear teeth spaced about the centerline and configured to be engaged by a drive pinion so to angularly displace the outer body about the central axis;

a plurality of rolling elements disposed between the inner and outer annular bodies so as to be rollable upon the inner and outer races to rotatably couple the inner and outer bodies; and an annular seal coupled with the outer annular body and having an outside diameter, opposing first and second axial ends, an axial thickness being defined between the axial ends, a sealing lip sealing against the inner annular body, the seal being sized such that the ratio of the seal outside diameter to the seal axial thickness is greater than fifty (50);

wherein the outer annular body has an axial end and a circular recess extending inwardly from the axial end, the circular recess being defined by an inner circumferential surface and a radial surface spaced from the outer ring axial end, and the seal has an outer circumferential surface and is disposed within the circular recess of the outer annular body such that the seal outer surface is spaced inwardly from the recess inner surface, the seal first axial end is disposed against the recess radial surface and the seal second axial end is disposable against a flange of the rotatable member.

2. The slewing bearing as recited in claim 1 wherein the ratio of the seal outside diameter to the seal axial thickness is greater than eighty (80).

3. The slewing bearing as recited in claim 1 wherein the seal has a main body portion with inner and outer radial ends and the sealing lip extends radially inwardly and axially from the inner radial end of the main body portion.

4. The slewing bearing as recited in claim 1 wherein:
the seal has an outer annular recess extending radially inwardly from the seal outer surface; and
the slewing bearing further comprises a retainer ring disposed within the seal outer recess and against the recess inner circumferential surface, the ring being configured to retain the seal within the outer body recess.

5. The slewing bearing as recited in claim 4 wherein the seal further has an axial annular recess extending axially inwardly from the second axial end and the slewing bearing further comprises a seal ring disposed within the axial recess and compressible between the seal and the rotatable member flange.

6. The slewing bearing as recited in claim 1 wherein:
the outer annular body has a main body portion with inner and outer circumferential surfaces, the outer race being formed in the inner circumferential surface and the plurality of gear teeth extending radially outwardly from the outer surface, and a radial flange portion extending inwardly from the main body portion and having opposing first and second radial surfaces, the first radial surface providing the recess radial surface; and
the inner annular body has a main body portion with an inner circumferential surface and an outer circumferential surface, the inner race being formed within the outer surface and the inner surface defining a central bore, and opposing first and second radial surfaces, and an axial flange portion extending from main body portion adjacent to the inner circumferential surface and having an outer circumferential surface providing the seal engagement surface, the flange portion of the outer annular body being spaced axially from the first radial surface of the inner annular body.

7. The slewing bearing as recited in claim 6 wherein:
the main body portion of the inner annular body has an annular groove extending radially inwardly from the outer circumferential surface and disposed axially between the inner race and the second radial surface; and the slewing bearing further comprises an annular seal disposed within the groove of the inner annular body and having a sealing lip sealingly engageable with the second axial end of the outer annular body.

8. The slewing bearing as recited in claim 1 wherein the plurality of gear teeth are integrally formed with the main body portion of the outer annular body.

9. The slewing bearing as recited in claim 1 wherein the plurality of gear teeth are provided by a separate polymeric ring attached to a remainder of the outer annular body.

10. The slewing bearing as recited in claim 1 wherein:
the inner annular body is formed of unhardened stainless steel and inner bearing race has an unhardened race surface; and
an outer annular body is formed of unhardened stainless steel and outer bearing race has an unhardened race surface.

11. The slewing bearing as recited in claim 1 wherein the seal is formed of a food grade polymeric material.

12. A slewing bearing for angularly displacing a rotatable member with respect to a fixed member about a central axis, the slewing bearing comprising:
an inner annular body formed of unhardened stainless steel and coupleable with the fixed member, the inner annular body having a centerline coaxial with the central axis and an inner bearing race with an unhardened race surface;
an outer annular body disposed about the inner body and formed of unhardened stainless steel, coupled with the rotatable member, and having an outer bearing race with an unhardened race surface spaced radially outwardly from the inner race and a plurality of gear teeth spaced about the centerline and configured to be engaged by a drive pinion so to angularly displace the outer body about the centerline;
a plurality of rolling elements disposed between the inner and outer annular bodies so as to be rollable upon the inner and outer races to rotatably couple the inner and outer bodies; and
an annular seal coupled with the outer annular body and having opposing first and second axial ends and an outside diameter, an axial thickness being defined between the axial ends and a sealing lip sealingly engageable with the inner annular body, the seal being sized such that the ratio of the seal outside diameter to the seal axial thickness is greater than fifty (50);
wherein the outer annular body has an axial end and a circular recess extending inwardly from the axial end, the circular recess being defined by an inner circumferential surface and a radial surface spaced from the outer ring axial end, and the seal has an outer circumferential surface and is disposed within the circular recess of the outer annular body such that the seal outer surface is spaced inwardly from the recess inner surface, the seal first axial end is disposed against the recess radial surface and the seal second axial end is disposable against a flange of the rotatable member.

13. The slewing bearing as recited in claim 12 wherein the seal has an outer annular recess extending radially inwardly from the seal outer surface, an axial annular recess extending axially inwardly from the second axial end, a first compressible ring disposed within the outer recess and compressed between the seal and the outer annular body and a second compressible ring disposed within the axial recess and compressible between the seal and the rotatable member flange.

14. The slewing bearing as recited in claim 12 wherein:
the outer annular body has a main body portion with inner and outer circumferential surfaces, the outer race being formed in the inner circumferential surface and the plurality of gear teeth extending radially outwardly from the outer surface, and a radial flange portion extending inwardly from the main body portion and having opposing first and second radial surfaces, the first radial surface providing the recess radial surface; and the inner annular body has a main body portion with inner and outer circumferential surfaces, the inner race being formed within the outer surface and the inner surface defining a central bore, and opposing first and second radial surfaces, and an axial flange portion extending from main body portion adjacent to the inner circumferential surface and having an outer circumferential surface providing the seal engagement surface, the flange portion of the outer annular body being spaced axially from the first radial surface of the inner annular body.

15. The slewing bearing as recited in claim 14 wherein:
the main body portion of the inner annular body has an annular groove extending radially inwardly from the outer circumferential surface and disposed axially between the inner race and the second radial surface; and the slewing bearing further comprises an annular seal disposed within the groove of the inner annular body and having a sealing lip sealingly engageable with the second axial end of the outer annular body.

16. The slewing bearing as recited in claim 12 wherein one of:
the plurality of gear teeth are integrally formed with the main body portion of the outer annular body; and the plurality of gear teeth are provided by a separate polymeric ring attached to a remainder of the outer annular body.

\* \* \* \* \*